(12) United States Patent
Boissy et al.

(10) Patent No.: US 9,146,838 B2
(45) Date of Patent: Sep. 29, 2015

(54) CODE AND MODEL COVERAGE AS A TIME SERIES

(71) Applicant: The MathWorks, Inc., Natick, MA (US)

(72) Inventors: David M. Boissy, Harvard, MA (US); Barton D. Addis, Belmont, MA (US); William J. Aldrich, Sudbury, MA (US); Stacey Gage, Medway, MA (US); George Quievryn, Stow, MA (US)

(73) Assignee: The MathWorks, Inc., Natick, MA (US)

( * ) Notice: Subject to any disclaimer, the term of this patent is extended or adjusted under 35 U.S.C. 154(b) by 148 days.

(21) Appl. No.: 13/908,136

(22) Filed: Jun. 3, 2013

(65) Prior Publication Data
US 2014/0359580 A1 Dec. 4, 2014

(51) Int. Cl.
*G06F 17/50* (2006.01)
*G06F 11/00* (2006.01)
*G06F 9/44* (2006.01)
*G06F 11/36* (2006.01)

(52) U.S. Cl.
CPC .................................. *G06F 11/3664* (2013.01)

(58) Field of Classification Search
CPC . G06F 11/323; G06F 11/362; G06F 11/3664; G06F 11/3676; G06F 9/77; G06F 11/261; G06F 11/263; G06F 11/3616; G06F 11/3688; G06F 11/3466; G06F 11/3636; G06F 8/10
See application file for complete search history.

(56) References Cited

U.S. PATENT DOCUMENTS

| | | | | |
|---|---|---|---|---|
| 5,748,878 | A * | 5/1998 | Rees et al. | 717/130 |
| 6,212,675 | B1 * | 4/2001 | Johnston et al. | 717/107 |
| 6,959,431 | B1 * | 10/2005 | Shiels et al. | 717/124 |
| 7,496,895 | B1 | 2/2009 | Mosterman et al. | |
| 7,720,662 | B1 | 5/2010 | Aldrich | |
| 8,234,105 | B1 | 7/2012 | Aldrich et al. | |
| 8,423,345 | B1 * | 4/2013 | Aldrich et al. | 717/131 |
| 8,522,215 | B1 * | 8/2013 | Aldrich et al. | 717/126 |
| 2006/0155521 | A1 * | 7/2006 | Iwashita | 703/14 |
| 2007/0016394 | A1 * | 1/2007 | Gaudette | 703/19 |
| 2009/0019428 | A1 * | 1/2009 | Li et al. | 717/128 |
| 2009/0293044 | A1 | 11/2009 | Boettcher et al. | |
| 2009/0313607 | A1 * | 12/2009 | Harding et al. | 717/125 |
| 2011/0047531 | A1 * | 2/2011 | Wang | 717/130 |
| 2011/0047532 | A1 * | 2/2011 | Wang | 717/130 |

(Continued)

OTHER PUBLICATIONS

Vector Informatik GmbH, "CANape-Calibrating ECUs Optimally", https://vector.com/vi_canape.en.html, Mar. 21, 2013 (Last Modified Date); 1 page.

(Continued)

*Primary Examiner* — Don Wong
*Assistant Examiner* — Anibal Rivera
(74) *Attorney, Agent, or Firm* — Harrity & Harrity, LLP

(57) ABSTRACT

A device receives code that is an executable representation of a dynamic system that includes a behavior that changes over time, and executes one or more portions of the code. The device determines coverage information associated with the executing code, where the coverage information provides a measure of completeness associated with the executing code. The device receives a selected option for displaying the coverage information, and provides for display a time-based view of the coverage information based on the selected option. The device permits a user to manipulate one or more time periods associated with the time-based view.

21 Claims, 19 Drawing Sheets

(56) References Cited

U.S. PATENT DOCUMENTS

| | | | |
|---|---|---|---|
| 2011/0197098 A1* | 8/2011 | Sobolev et al. | 714/38.1 |
| 2012/0017195 A1* | 1/2012 | Kaulgud et al. | 717/101 |
| 2012/0159452 A1 | 6/2012 | DeLine et al. | |
| 2012/0311540 A1* | 12/2012 | Fanning et al. | 717/127 |
| 2013/0111267 A1* | 5/2013 | Beryoza et al. | 714/32 |
| 2013/0298110 A1* | 11/2013 | Boden et al. | 717/125 |
| 2014/0282388 A1* | 9/2014 | Malkin et al. | 717/113 |
| 2014/0282406 A1* | 9/2014 | Narasimhan et al. | 717/124 |

OTHER PUBLICATIONS

Notification of Transmittal of the International Search Report and the Written Opinion of the International Searching Authority, or the Declaration corresponding to PCT/US2014/039742 mailed on Oct. 9, 2014, 9 pages.

* cited by examiner

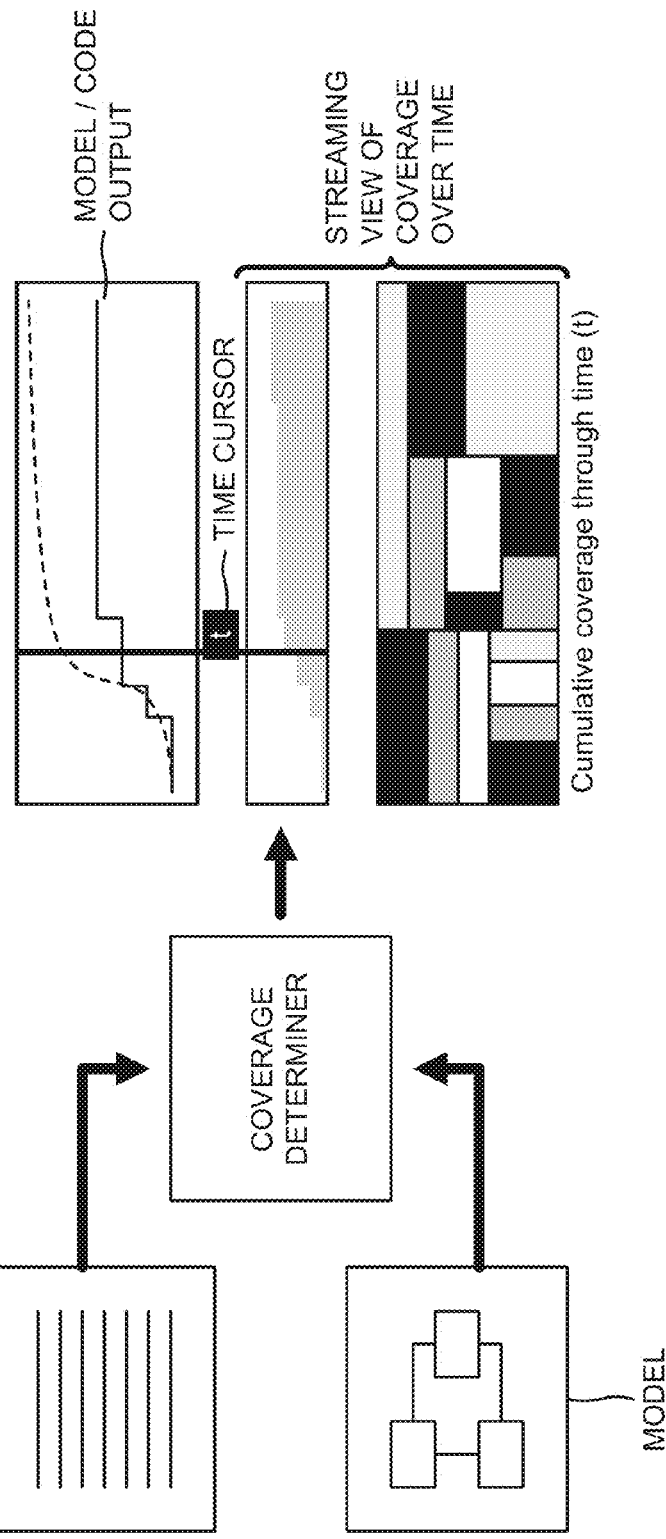

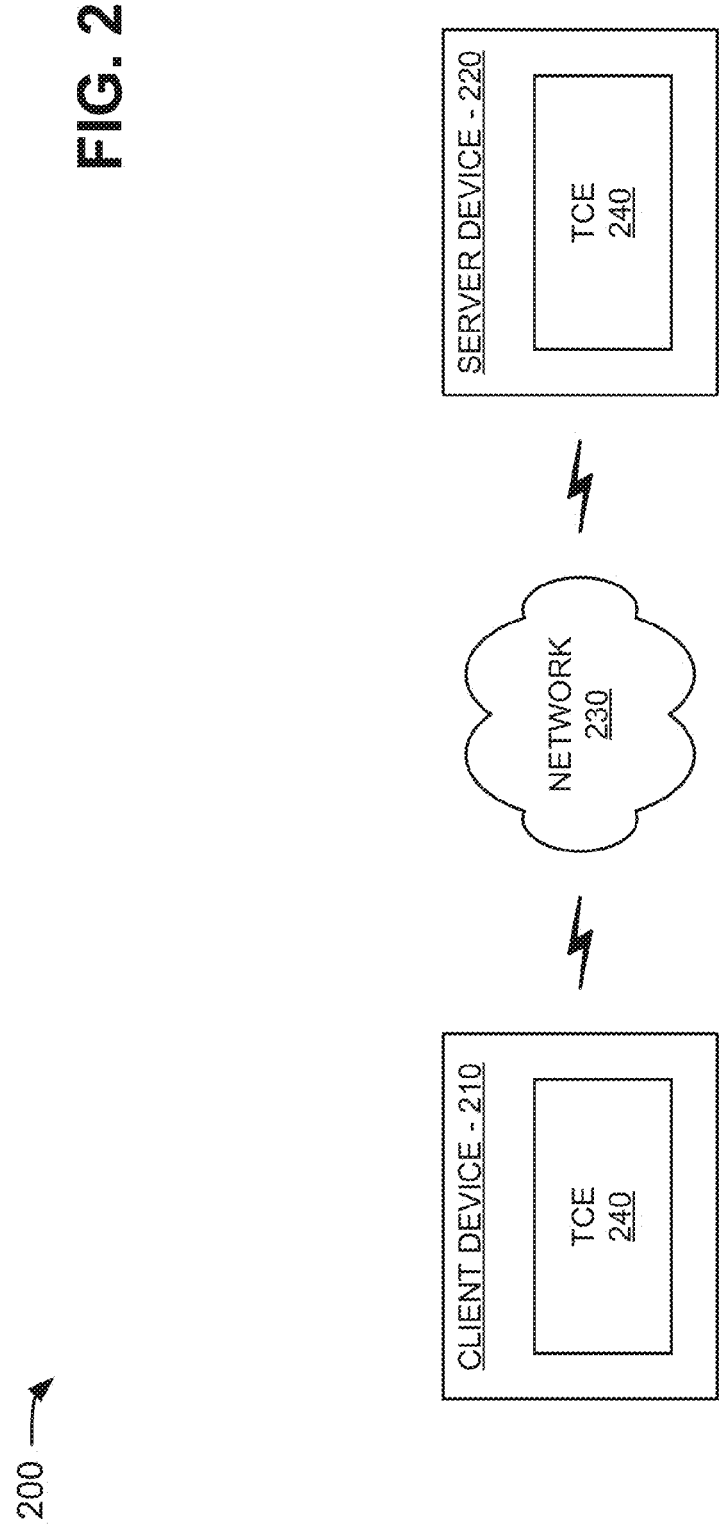

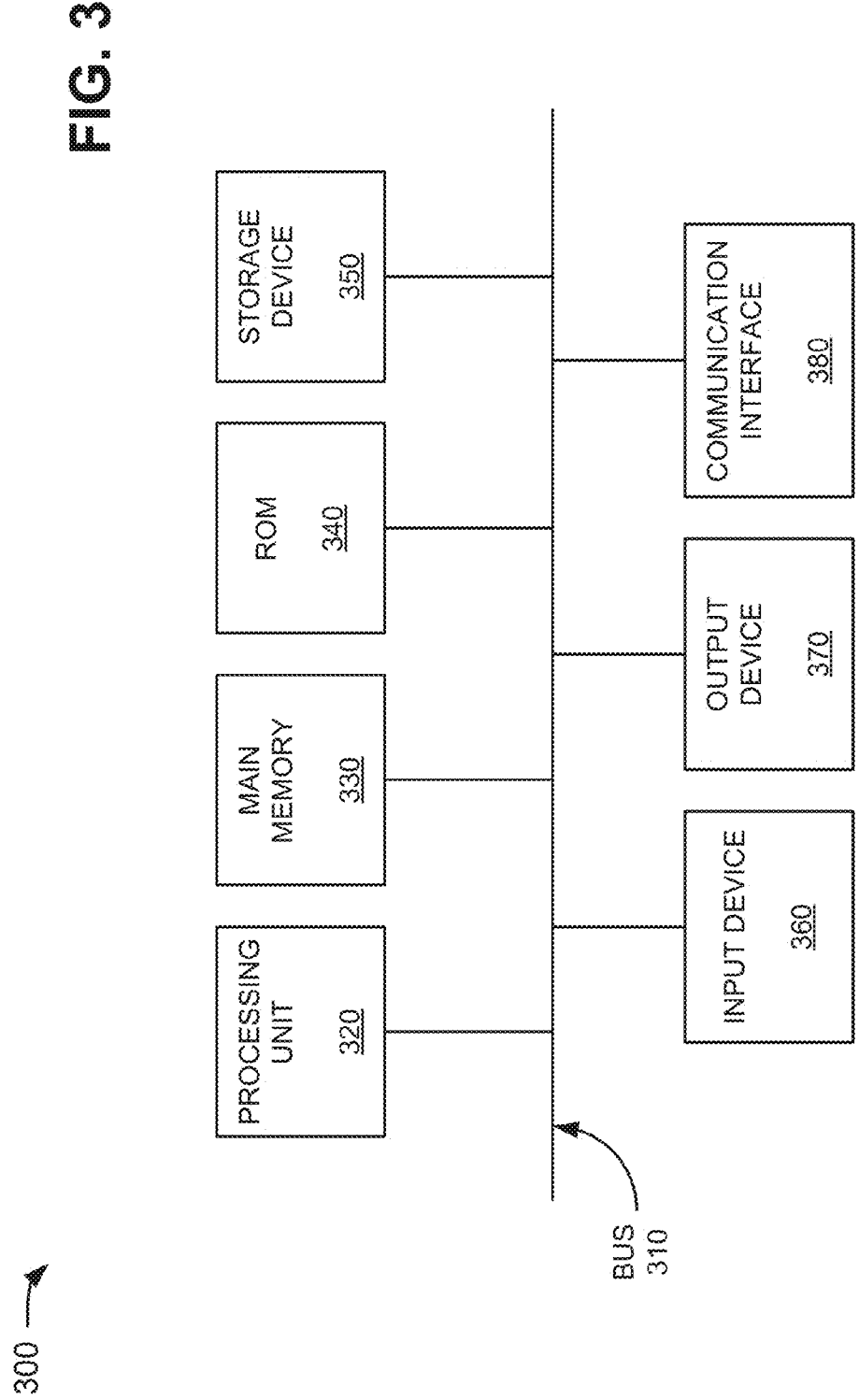

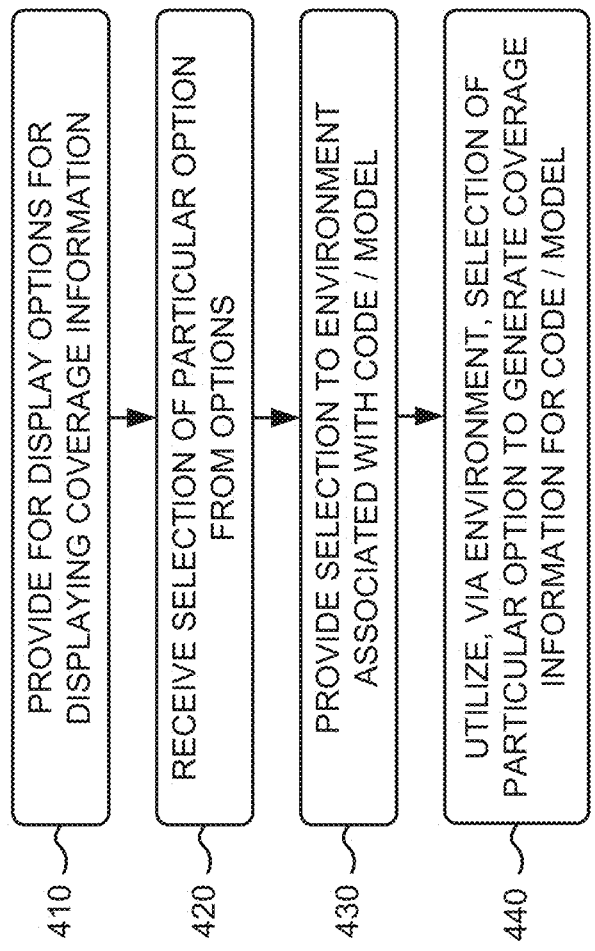

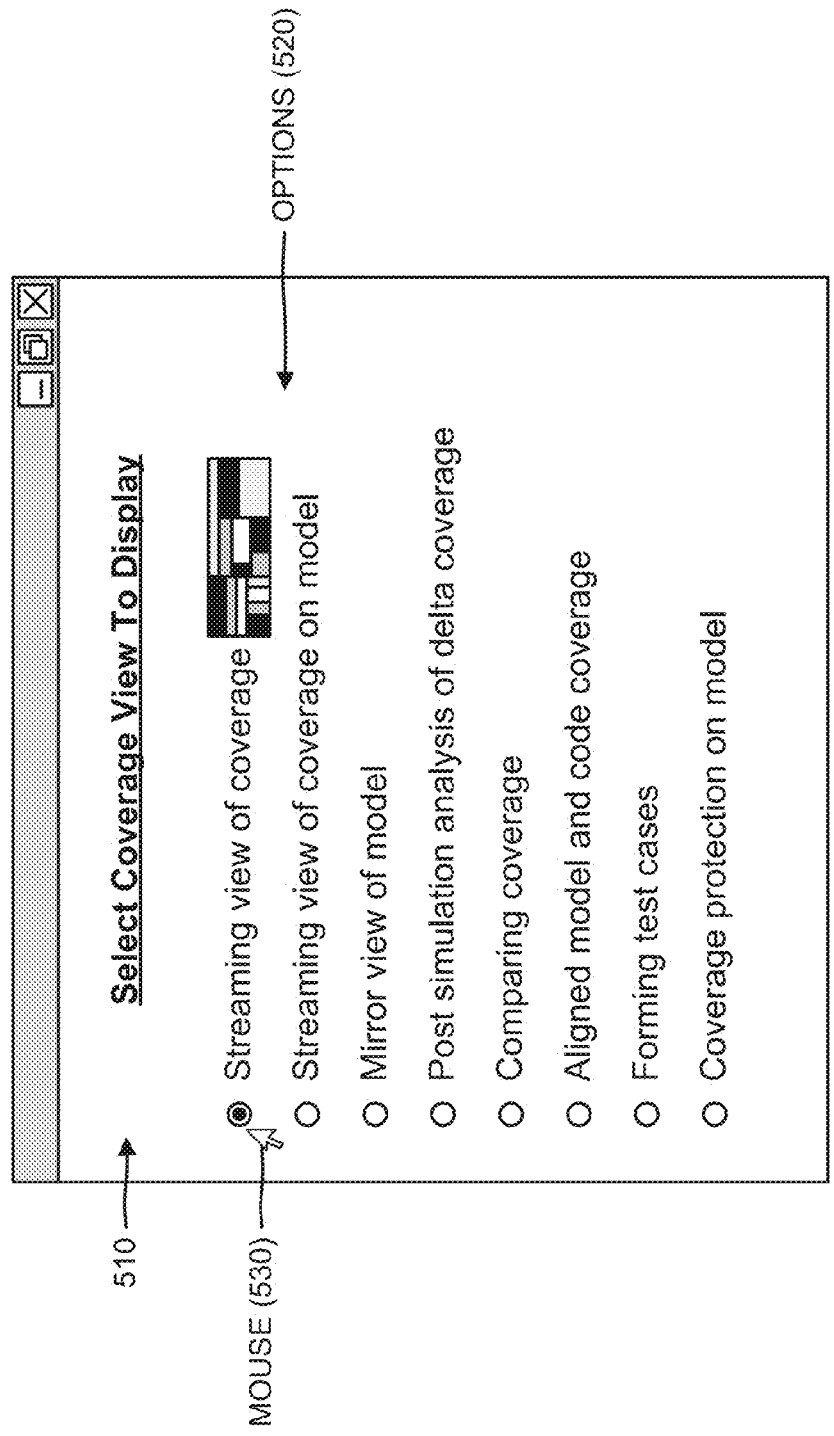

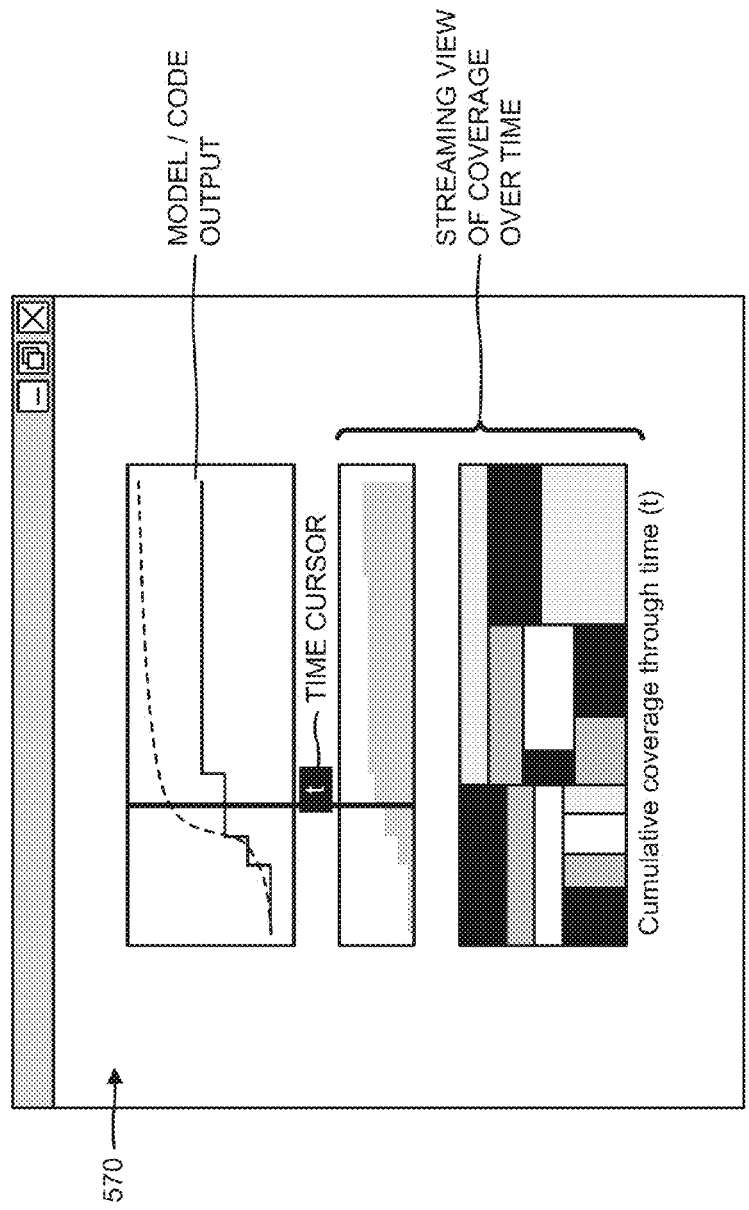

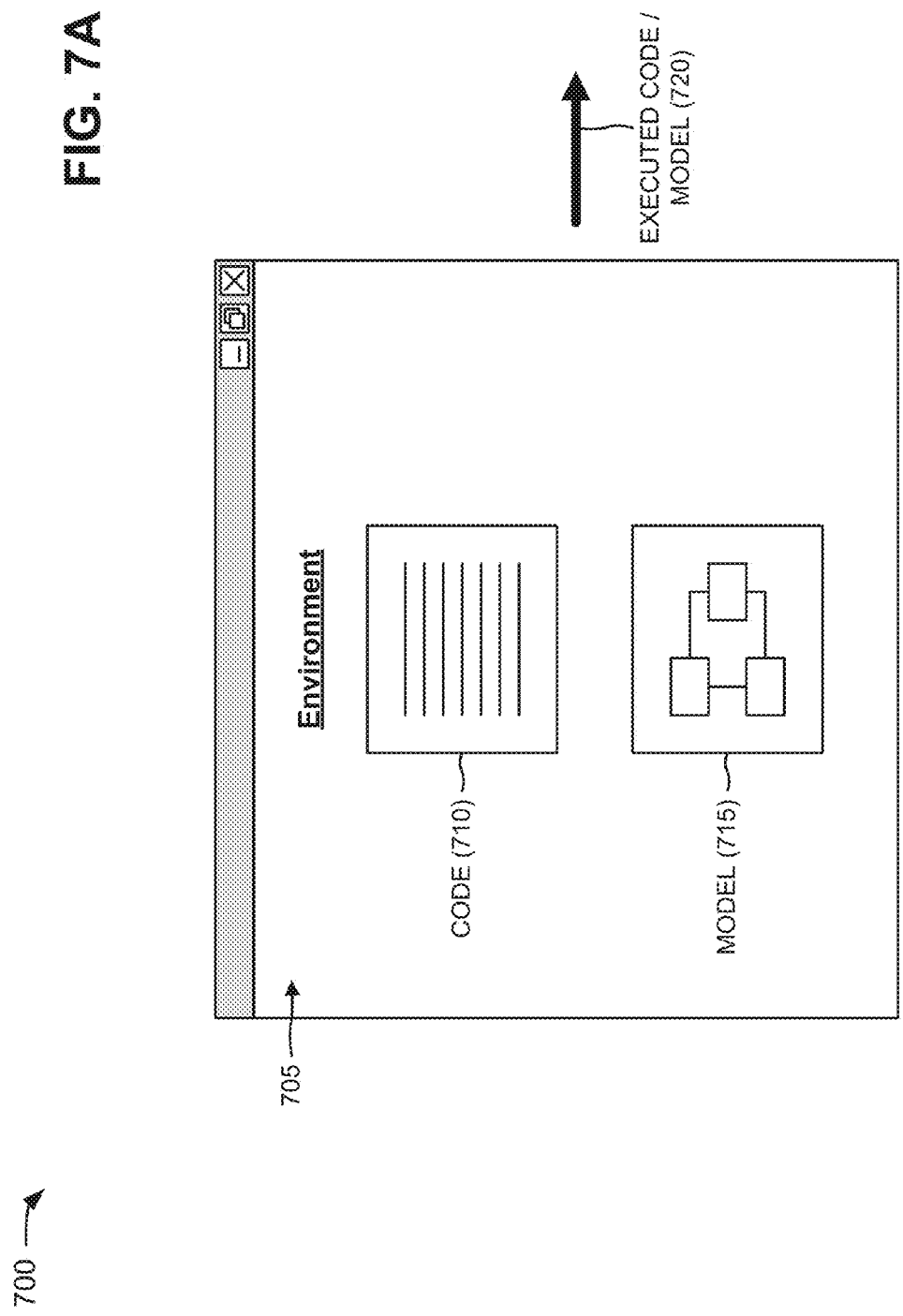

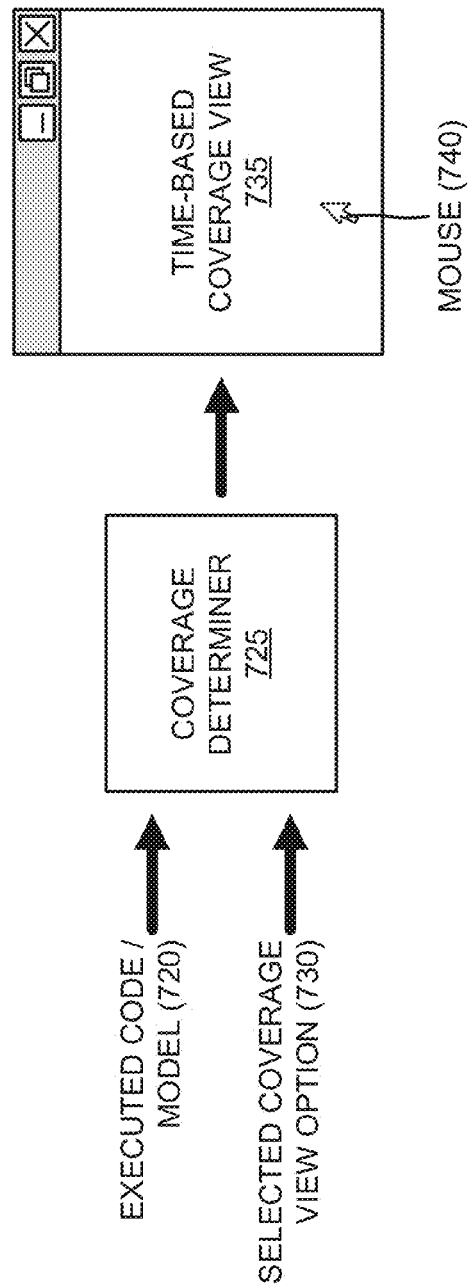

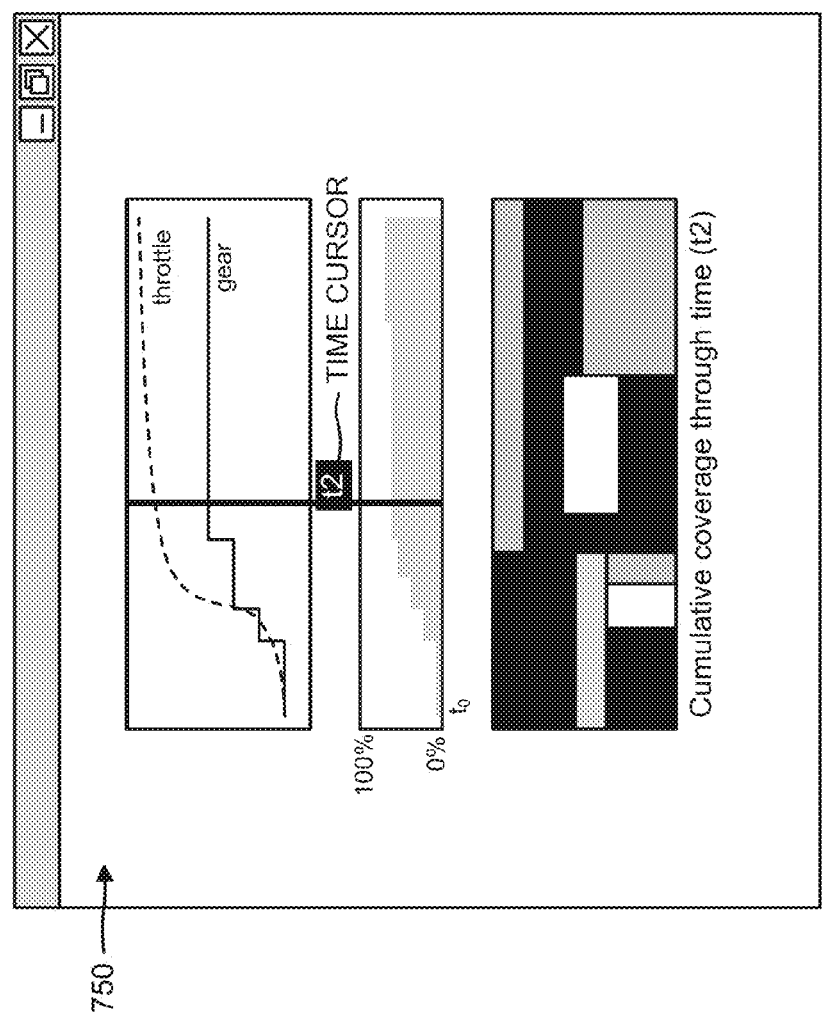

CODE AND MODEL COVERAGE AS A TIME SERIES

BRIEF DESCRIPTION OF THE DRAWINGS

The accompanying drawings, which are incorporated in and constitute a part of this specification, illustrate one or more implementations and, together with the description, explain these implementations. In the drawings:

FIG. 1 is a diagram of an overview of an example implementation described herein;

FIG. 2 is a diagram of an example environment in which systems and/or methods described herein may be implemented;

FIG. 3 is a diagram of example components of one or more of the devices of the environment depicted in FIG. 2;

FIG. 4 is a flow chart of an example process for selecting an option for displaying coverage information associated with code and/or a model;

FIGS. 5A-5C are diagrams of an example of the process described in connection with FIG. 4;

FIGS. 7A-7K are diagrams of an example of the process described in connection with FIG. 6.

DETAILED DESCRIPTION

Figure 5B:
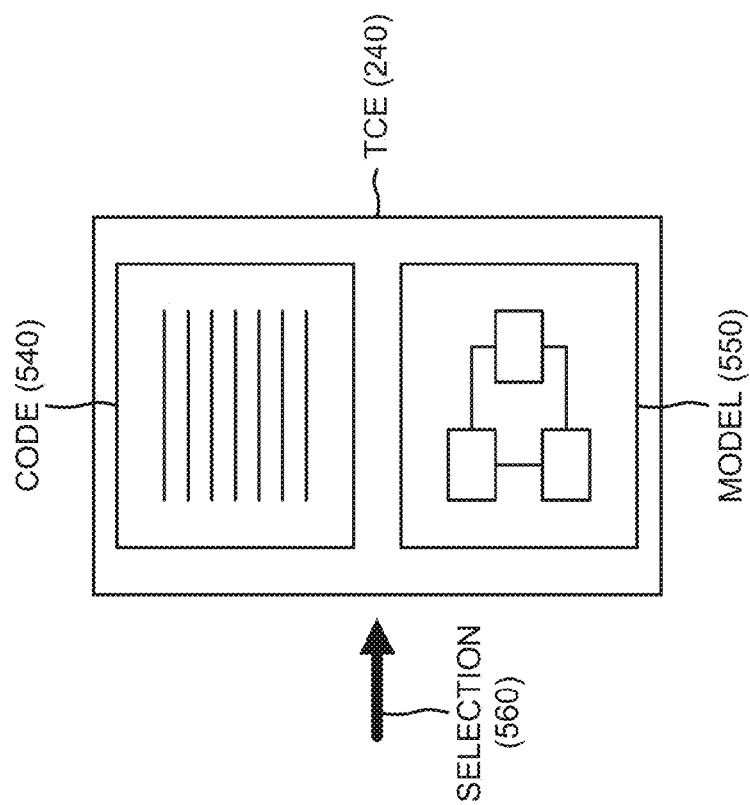

The following detailed description refers to the accompanying drawings. The same reference numbers in different drawings may identify the same or similar elements.

Graphical modeling tools that provide an abstract view of a component or a system in modeling and/or computing environments can improve the effectiveness and efficiency of software development processes. Useful modeling tools have unambiguous semantics, can execute designs, and are used as behavioral specifications. Coverage analysis within a behavioral specification can indicate a completeness and consistency of a set of requirements. Coverage analysis is used to dynamically analyze a way that code or a model executes, and may provide a measure of completeness of testing based on the code or model structure.

A simple form of coverage analysis may include statement coverage. Full statement coverage may indicate that every statement in the code or model has executed at least once. However, statement coverage does not completely analyze control flow constructs within the code or model. A more rigorous form of coverage may include decision coverage. Full decision coverage may indicate that each control flow point in the code or model has taken every possible outcome at least once. However, decision coverage ignores complications that result when a decision is determined by a logical expression containing logical operators (e.g., AND, OR, etc.). Furthermore, coverage analysis techniques provide coverage information associated with complete execution of the code or model.

Overview

Systems and/or methods described herein may enable coverage information for a model and/or code to be displayed in a time-based view. The systems and/or methods may execute the model and/or code, and may determine coverage information, associated with the executing model and/or code, over time. The coverage information may be stored and may be displayed in the time-based view. The time-based view may provide a mechanism (e.g., a time cursor) that may enable a user to change a time associated with the coverage information. The user may manipulate the mechanism so that different views of the coverage information may be displayed over time.

In some implementations, the model and/or the code may represent a dynamic system, such as, for example, a system that exhibits a behavior over time. In some implementations, the systems and/or methods may apply to an evolution index that includes a sequence of evaluations, such as, for example, in executing software that may not have an explicit relation with execution time.

FIG. 1 is a diagram of an overview of an example implementation described herein. For the overview, assume that a device includes a coverage determiner. The coverage determiner may receive code and/or a model, and may perform a coverage analysis on the code and/or the model. In some implementations, the coverage determiner may execute the code and/or the model, and may determine coverage information associated with the executing code and/or model. The coverage determiner may store the determined coverage information. In some implementations, the coverage determiner may determine and store other time-based information associated with the executing code and/or model, such as, for example, minimum/maximum range coverage, overflow information, profiling information, memory consumption, etc.

The device may display (e.g., to a user) options associated with displaying the coverage information. The user may select a particular option from the displayed options, and the device may receive the selection of the particular option. The device may display a time-based view of the coverage information based on the particular option. For example, for the overview, assume that the user selected a streaming view of the coverage information. Based on this selection, the device may display an output of the executed code and/or model and a streaming view of coverage over time, as further shown in FIG. 1. The streaming view of coverage may include a stacked area plot that shows aggregate coverage over time. The stacked area plot may align with numeric data of the output of the executed code and/or model. The streaming view of coverage may include a treemap that represents files, functions, etc. of the code and/or blocks, subsystems, etc. of the model. The surface area of the treemap may provide an indication of the coverage by the code and/or the model. During execution of the code and/or the model, one or more portions of the treemap may transform from a lighter color (e.g., white, which may indicate no coverage) to a darker color (e.g., black, which may indicate complete coverage).

The device may also display a mechanism (e.g., a time cursor) that may enable the user to change a time associated with the coverage information. The user may manipulate the time cursor so that different views of the coverage information may be displayed with respect to time. In some implementations, the user may move the time cursor, and portions of the treemap may change color based on the time cursor movement. For example, if the user moves the time cursor to the right (e.g., increasing time), one or more portions of the treemap may become darker (e.g., indicating more coverage by the code and/or the model). In some implementations, the user may perform debugging of the code and/or the model based on coverage information. For example, the user may break and debug when an expression is evaluated that increases the coverage.

Such an arrangement may enable a user to determine code and/or model coverage information over different points in time, rather than at one particular time (e.g., after the model or code has executed). This may enable the user to more quickly determine whether a particular function, block, file, etc. of the code and/or the model is not executing properly. The arrangement may also enable the user to more quickly perform a causality analysis (e.g., changing an input that changes one or more outputs) on the code and/or the model. The user may also observe a difference between two points in time in order to study additional coverage. The additional coverage may be in an absolute sense (e.g., what is actually covered) or in a relative sense (e.g., what is covered at a second point in time in addition to what already is covered at a first point in time), which may be equal to or less than an absolute coverage because the coverage may not show what is covered already until the first point in time.

User interfaces, as described herein, may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

The term code, as used herein, is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

The term model, as used herein, is to be broadly interpreted to include a textual model; a block diagram model with one or more model elements (e.g., blocks), one or more inputs, and one or more outputs; a combination of a textual model and a graphical model; etc. Each of the model elements may include a representation (e.g., a block) of a hardware device, a subsystem, another model, etc. of a system being modeled. A model may require further processing before the model can be compiled into a binary file, synthesized into a bitstream, etc. A model may be declarative in that the model may not allow the user to explicitly specify when a state of a machine that the model is executing on changes. In a declarative model, the user may not explicitly specify an order in which state changes in the model. In an imperative model, the user may explicitly specify when a particular state may change (e.g., relative to other state changes).

Example Environment Arrangement

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices. In some implementations, client device 210 may include a TCE 240, described below.

Server device 220 may include one or more server devices, or other types of computation and communication devices. Server device 220 may include a device that is capable of communicating with client device 210 (e.g., via network 230). In some implementations, server device 220 may include one or more laptop computers, personal computers, workstation computers, servers, central processing units (CPUs), graphical processing units (GPUs), application-specific integrated circuits (ASICs), field-programmable gate arrays (FPGAs), etc. In some implementations, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN) or a cellular network, an intranet, the Internet, or a combination of networks.

As indicated above, TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In some implementations, TCE 240 may provide these functions and/or tools using toolboxes (e.g., toolboxes for signal processing, image processing, data plotting, parallel processing, etc.). In some implementations, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3]

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in some implementations, environment 200 may include fewer components, different components, differently arranged components, or additional components than those depicted in FIG. 2. Alternatively, or additionally, one or more components of environment 200 may perform one or more tasks described as being performed by one or more other components of environment 200.

Example Device Architecture

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in some implementations, device 300 may include fewer components, different components, differently arranged components, or additional components than depicted in FIG. 3. Alternatively, or additionally, one or more components of device 300 may perform one or more tasks described as being performed by one or more other components of device 300.

Example Process for Selecting an Option for Displaying Coverage Information Associated with Code/Model FIG. 4 is a flow chart of an example process 400 for selecting an option for displaying coverage information associated with code and/or a model. In some implementations, process 400 may be performed by client device 210 (e.g., TCE 240). In some implementations, process 400 may be performed by another device or a group of devices (e.g., server device 220) separate from or including client device 210.

As shown in FIG. 4, process 400 may include providing for display options for displaying coverage information (block 410). For example, client device 210 may perform a coverage analysis on one or more portions of code and/or a model. In some implementations, the coverage analysis may include determining coverage information (e.g., a completeness and consistency of a set of requirements, a way that the code and/or model executes, a measure of completeness of testing based on the code and/or model structure, etc.) for the code and/or the model. In some implementations, client device 210 may perform other analyses on one or more portions of the code and/or the model, such as, for example, a minimum and maximum range analysis, an overflow analysis, a profiling analysis, a memory consumption analysis, etc.

Based on the coverage analysis, client device 210 may generate several coverage views for displaying the determined coverage information. Client device 210 may enable a user to select one of the coverage views by displaying one or more options associated with the coverage views. For example, client device 210 may display images providing examples of the coverage views, may display descriptions of the coverage views, may display images and descriptions of the coverage views, etc.

As further shown in FIG. 4, process 400 may include receiving a selection of a particular option from the options (block 420). For example, a user associated with client device 210 may utilize an input mechanism (e.g., a keyboard, a mouse, etc.) to select one of the options associated with the coverage views. In some implementations, the user may select a particular image that provides an example of a particular coverage view desired by the user. In some implementations, the user may select a particular description, or a mechanism (e.g., a checkbox) associated with the particular description, of a particular coverage view desired by the user. Client device 210 may receive the selection of the particular coverage view.

As further shown in FIG. 4, process 400 may include providing the selection to an environment associated with code and/or a model (block 430). For example, client device 210 may provide information associated with the selected coverage view to TCE 240, and TCE 240 may receive the information associated with the selected coverage view. TCE 240 may be associated with code and/or a model to which the selected coverage view is to be applied. In some implementations, client device 210 may include a coverage determiner (e.g., as described above in connection with FIG. 1) that receives the code and/or the model and performs a coverage analysis on the code and/or the model. The coverage determiner may execute the code and/or the model, and may determine coverage information associated with the executing code and/or model. The coverage determiner may store the determined coverage information.

Returning to FIG. 4, process 400 may include utilizing, via the environment, the selection of the particular option to generate coverage information for the code and/or the model (block 440). For example, client device 210/TCE 240 may execute the code and/or the model, and may determine coverage information, over time, associated with the executing code and/or model. After determining the coverage information, client device 210 may generate the selected coverage view based on the coverage information. Client device 210 may display the selected coverage view to the user, and the user may manipulate information provided in the selected coverage view, as described below in connection with FIGS. 6-7K.

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel.

Example Selection and Display of Coverage Information Associated with Code/Model FIGS. 5A-5C are diagrams of an example 500 of the process described above with respect to FIG. 4. In example 500, assume that client device 210 provides a user interface 510 for display to a user, as shown in FIG. 5A. User interface 510 may include information that enables a user to select a coverage view for displaying coverage information. For example, user interface 510 may include information instructing the user to select one or more coverage views from options 520. Options 520 may include a list of coverage views for displaying coverage information associated with an executed code and/or model. As further shown in FIG. 5A, the list of coverage views may include descriptions of the coverage views, selection mechanisms (e.g., checkboxes) associated with the descriptions, and/or images displaying examples of the coverage views. The list of coverage views may include, for example, a streaming view of coverage, a streaming view of coverage on a model, a mirror view of a model, a post simulation analysis of delta coverage, a comparing coverage, an aligned model and code coverage, a forming test cases, a coverage projection on a model, etc. Each of these coverage views are described below in connection with FIGS. 7C-7K.

In example 500, assume further that the user utilizes a selection mechanism (e.g., a mouse cursor 530) to select a checkbox associated with the streaming view of coverage. The checkbox, when selected, may instruct client device 210 to provide the selection of the streaming view of coverage to an environment. For example, as shown in FIG. 5B, assume that client device 210 is associated with TCE 240, and that TCE 240 includes code 540 and/or a model 550. Further assume that client device 210/TCE 240 executes code 540 and/or model 550, and generates coverage information associated with the executed code 540 and/or model 550. As further shown in FIG. 5B, client device 210 may provide a selection 560 of the streaming view to TCE 240.

Based on selection 560, client device 210/TCE 240 may generate the streaming view of coverage based on the coverage information associated with the executed code 540 and/or model 550. In example 500, further assume that client device 210 generates the streaming view of coverage in a user interface 570, and provides user interface 570 for display to the user, as shown in FIG. 5C. User interface 570 may include an output of the executed code 540 and/or model 550 and a streaming view of coverage over time, as further shown in FIG. 5C. The output of the executed code 540 and/or model 550 may include one or more outputs generated by code 540 and/or model 550 over time.

The streaming view of coverage may include a stacked area plot that shows aggregate coverage over time. The stacked area plot may align with numeric data of the output of the executed code 540 and/or model 550. The streaming view of coverage may include a treemap that represents files, functions, etc. of code 540 and/or blocks, subsystems, etc. of model 550. The surface area of the treemap may provide an indication of the cumulative coverage by code 540 and/or model 550 through a particular time (e.g., time t). During execution of code 540 and/or model 550, one or more portions of the treemap may transform from a lighter color (e.g., white, which may indicate no coverage) to a darker color (e.g., black, which may indicate complete coverage). In some implementations, different color schemes may be utilized to indicate coverage information.

User interface 570 may also include a mechanism (e.g., a time cursor) that may enable the user to change a time associated with the coverage information. The user may manipulate the time cursor so that different views of the coverage information may be displayed over time. In some implementations, the user may move the time cursor and portions of the treemap may change color based on the time cursor movement. For example, if the user moves the time cursor to the left (e.g., decreasing time), one or more portions of the treemap may become lighter (e.g., indicating less coverage by code 540 and/or model 550).

As indicated above, FIGS. 5A-5C are provided merely as an example. Other examples are possible and may differ from what was described with regard to FIGS. 5A-5C.

Example Process for Displaying Time-Based Coverage Information

Figure 6:
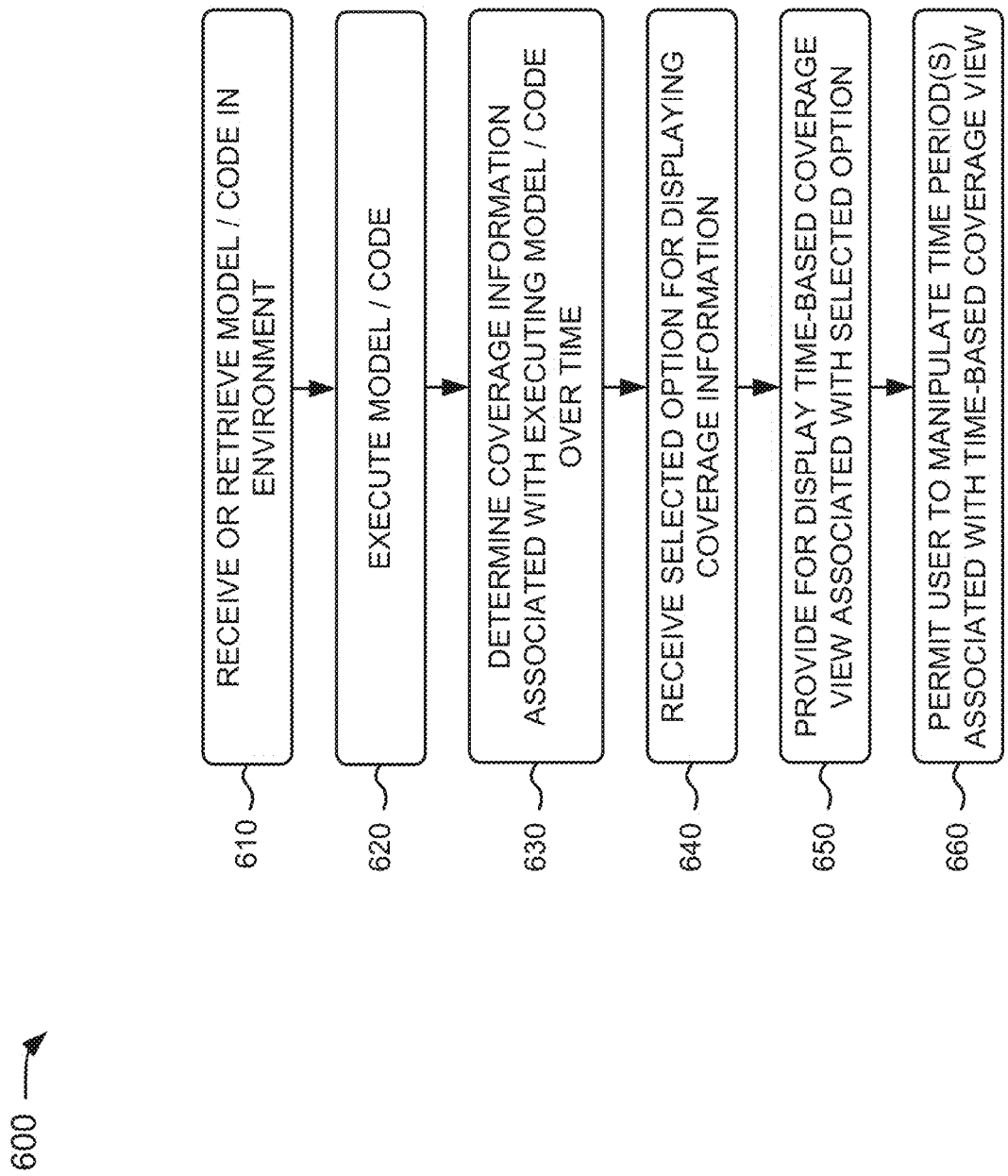
FIG. 6 is a flow chart of an example process for displaying time-based coverage information.

FIG. 6 is a flow chart of an example process 600 for displaying time-based coverage information. In some implementations, process 600 may be performed by client device 210 (e.g., TCE 240). In some implementations, process 600 may be performed by another device or a group of devices (e.g., server device 220) separate from or including client device 210.

As shown in FIG. 6, process 600 may include receiving or retrieving a model and/or code in an environment (block 610). For example, client device 210/TCE 240 may receive a model and/or code from a user associated with client device 210, from an external device, etc. In some implementations, the user may input the model and/or the code to client device 210 via TCE 240, via an external memory device (e.g., a CD ROM, a flash drive, etc.), etc. For example, client device 210 may execute a computing environment (e.g., TCE 240) that generates a user interface for inputting a model and/or code. Client device 210/TCE 240 may provide for display the user interface for inputting the model and/or code to the user. In some implementations, the user may create a new block diagram model or may input new code via the user interface. In some implementations, client device 210 may retrieve the model and/or the code from a memory (e.g., main memory 330, ROM 340, and/or storage device 350 of FIG. 3) associated with client device 210, and may provide the model and/or the code to TCE 240.

As further shown in FIG. 6, process 600 may include executing the model and/or code (block 620). For example, client device 210/TCE 240 may execute one or more portions of the model and/or the code. In some implementations, client device 210 may execute the one or more portions of the model and/or the code without TCE 240. In some implementations, client device 210/TCE 240 may execute the entire model and/or code to completion or the one or more portions of the model and/or the code to completion. In some implementations, execution of the model and/or the code may generate an output of the model and/or the code, as shown in FIGS. 1 and 5C.

As further shown in FIG. 6, process 600 may include determining coverage information associated with the executing model and/or code over time (block 630). For example, client device 210 may perform a coverage analysis on the model and/or the code, as the model and/or the code are being executed. In some implementations, client device 210 may store the determined coverage information in memory (e.g., main memory 330, ROM 340, and/or storage device 350 of FIG. 3). In some implementations, client device 210 may determine and store other time-based information associated with the executing model and/or code, such as, for example, minimum/maximum range coverage, overflow information, profiling information, memory consumption, etc.

Returning to FIG. 6, process 600 may include receiving a selected option for displaying the coverage information (block 640). For example, client device 210 may display, to the user, a list of options for displaying the coverage information, and the user may select one or more of the options, as described above in connection with FIG. 4. Client device 210 may receive the selected option, and may utilize the selected option to generate a time-based coverage view associated with the selected option.

As further shown in FIG. 6, process 600 may include providing for display a time-based coverage view associated with the selected option (block 650). For example, client device 210 may generate a time-based coverage view based on the coverage information associated with the executed model and/or code. In some implementations, client device 210 may generate the time-based coverage view in a user interface, and may provide the user interface for display to the user. The user interface may include an output of the executed model and/or code and the time-based coverage view. In some implementations, the time-based coverage view may include, for example, a streaming view of coverage, a streaming view of coverage on the model, a mirror view of the model, a post simulation analysis of delta coverage, a comparing coverage, an aligned model and code coverage, a forming test cases, a coverage projection on the model, etc. In some implementations, the time-based coverage information may be available as a signal in a time-based block diagram. This may permit a user, for example, to make logic decisions in model and/or code behavior based on the coverage information at a certain point in time.

Returning to FIG. 6, process 600 may include permitting a user to manipulate time period(s) associated with the time-based coverage view (block 660). For example, the time-based coverage view may include one or more time cursors that may be manipulated by the user. If the user manipulates the time cursor(s), client device 210 may adjust time period(s) associated with the time-based coverage view. In some implementations, the user may manipulate the time cursor(s) and client device 210 may generate and display different views of the coverage information over time.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Example Display of Time-Based Coverage Information

Figure 7C:
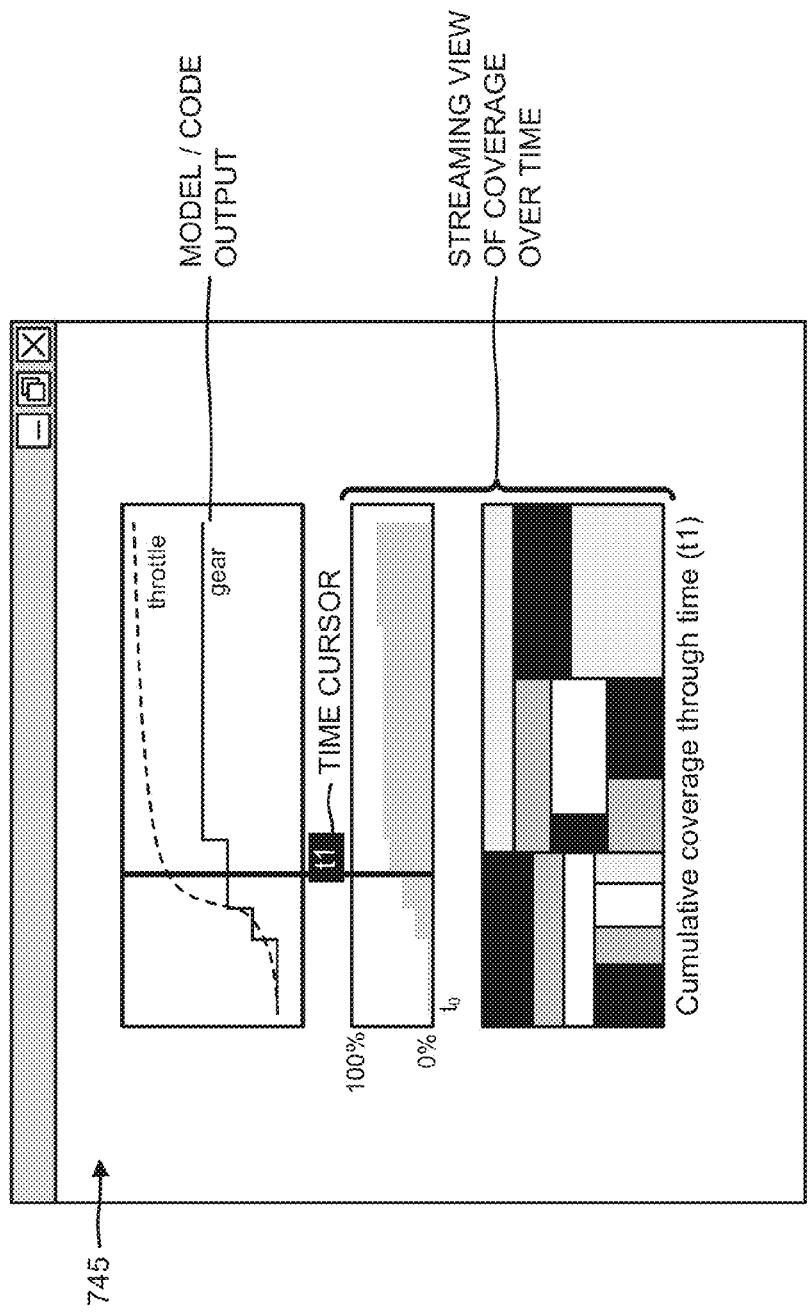

FIGS. 7A-7K are diagrams of an example 700 of the process described above with respect to FIG. 6. In example 700 and as shown in FIG. 7A, assume that client device 210 executes a computing environment (e.g., TCE 240) that generates a user interface 705 for inputting code 710 and/or a model 715. Client device 210/TCE 240 may display user interface 705 so that a user may input code 710 and/or model 715. In some implementations, code 710 may include TCE-based code, and model 715 may include a TCE-based model, TCE (e.g., MATLAB) expressions, etc. In some implementations, code 710 and/or model 715 may be associated with other types of computing environments, such as a C programming language environment, a hardware description language (HDL) environment, etc. Client device 210/TCE 240 may execute code 710 and/or model 715, and may output information associated the executed code 710 and/or model 715, as indicated by reference number 720 in FIG. 7A.

In example 700, further assume that client device 210 includes a coverage determiner 725 as shown in FIG. 7B. Coverage determiner 725 may receive the executed code 710 and/or model 715 (e.g., as indicated by reference number 720), and may receive a selected coverage view option 730. Selected coverage view option 730 may include one of options 520 (FIG. 5A) selected by the user. Coverage determiner 725 may perform a coverage analysis on the executed code 710 and/or model 715, and may determine coverage information associated with the executed code 710 and/or model 715 based on the coverage analysis.

Coverage determiner 725 may utilize selected coverage view option 730 to generate a time-based coverage view 735 associated with selected coverage view option 730. For example, coverage determiner 725 may generate time-based coverage view 735 based on the coverage information associated with the executed code 710 and/or model 715. Coverage determiner 725 may generate time-based coverage view 735 in a user interface, and may provide the user interface for display to the user, as further shown in FIG. 7B. The user interface may include an output of the executed model 710 and/or code 715 and time-based coverage view 735. In some implementations, time-based coverage view 735 may include, for example, one or more of the user interfaces described below in connection with FIGS. 7C-7K. The user may utilize an input mechanism (e.g., a mouse cursor 740) to manipulate coverage information provided in time-based coverage view 735.

In some implementations, coverage determiner 725 may generate a user interface 745 for time-based coverage view 735, as shown in FIG. 7C. User interface 745 may include an output of the executed model 710 and/or code 715, and a streaming view of coverage over time. In example 700, the output of the executed model 710 and/or code 715 may include information associated with a throttle and a gear. The streaming view of coverage may include a stacked area plot that shows aggregate coverage over time. The stacked area plot may align with numeric data of the output of the executed model 710 and/or code 715. The streaming view of coverage may include a treemap that represents files, functions, etc. of code 715 and/or blocks, subsystems, etc. of model 710. The surface area of the treemap may provide an indication of the cumulative coverage by model 710 and/or code 715 through a particular time. In some implementations, two time cursors may be provided, a first time cursor to indicate a start time and a second time cursor to indicate an end time with respect to which to present the analysis.

As further shown in FIG. 7C, user interface 745 may also include a time cursor that may enable the user to change a time associated with the coverage information. The user may manipulate the time cursor so that different views of the coverage information may be displayed over time. In example 700, the user may provide the time cursor at a particular time (e.g., time t1), and the surface area of the treemap may provide an indication of the cumulative coverage by model 710 and/or code 715 through the particular time.

With reference to FIG. 7D, coverage determiner 725 may generate a user interface 750 for time-based coverage view 735, after the user moves the time cursor to the right (e.g., to time t2). Movement of the time cursor from time t1 (FIG. 7C) to time t2 (FIG. 7D) may cause portions of the treemap to change color. For example, such movement of the time cursor may cause one or more portions of the treemap to become darker (e.g., indicating more coverage by model 710 and/or code 715).

Figure 7E:
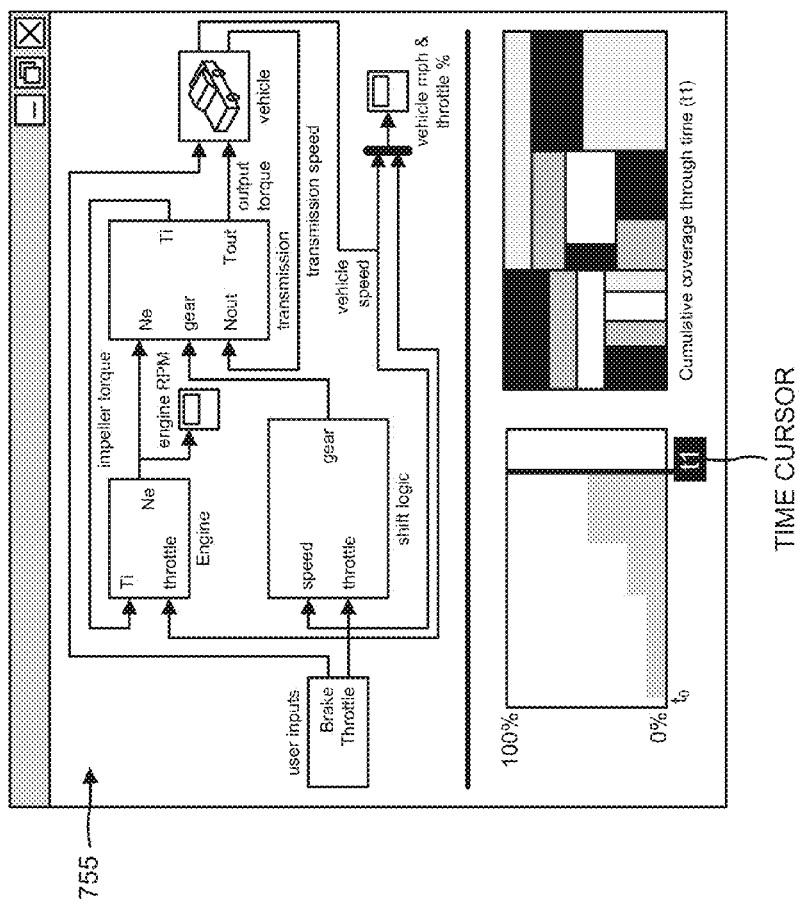

In some implementations, coverage determiner 725 may generate a user interface 755 for time-based coverage view 735, as shown in FIG. 7E. User interface 755 may include information associated with model 710, and a streaming view of coverage on model 710. In example 700, the information associated with model 710 may include blocks associated with components (e.g., a brake, a throttle, an engine, shift logic, a transmission, etc.) of a vehicle. The streaming view of coverage may include a stacked area plot that shows aggregate coverage over time. The streaming view of coverage may include a treemap that represents blocks, subsystems, etc. of model 710. The surface area of the treemap may provide an indication of the cumulative coverage by model 710 through a particular time.

As further shown in FIG. 7E, user interface 755 may also include a time cursor that may enable the user to change a time associated with the coverage information. The user may manipulate the time cursor so that different views of the coverage information may be displayed over time. In example 700, the user may provide the time cursor at a particular time (e.g., time t1), and the surface area of the treemap may provide an indication of the cumulative coverage by model 710 through the particular time.

Figure 7F:
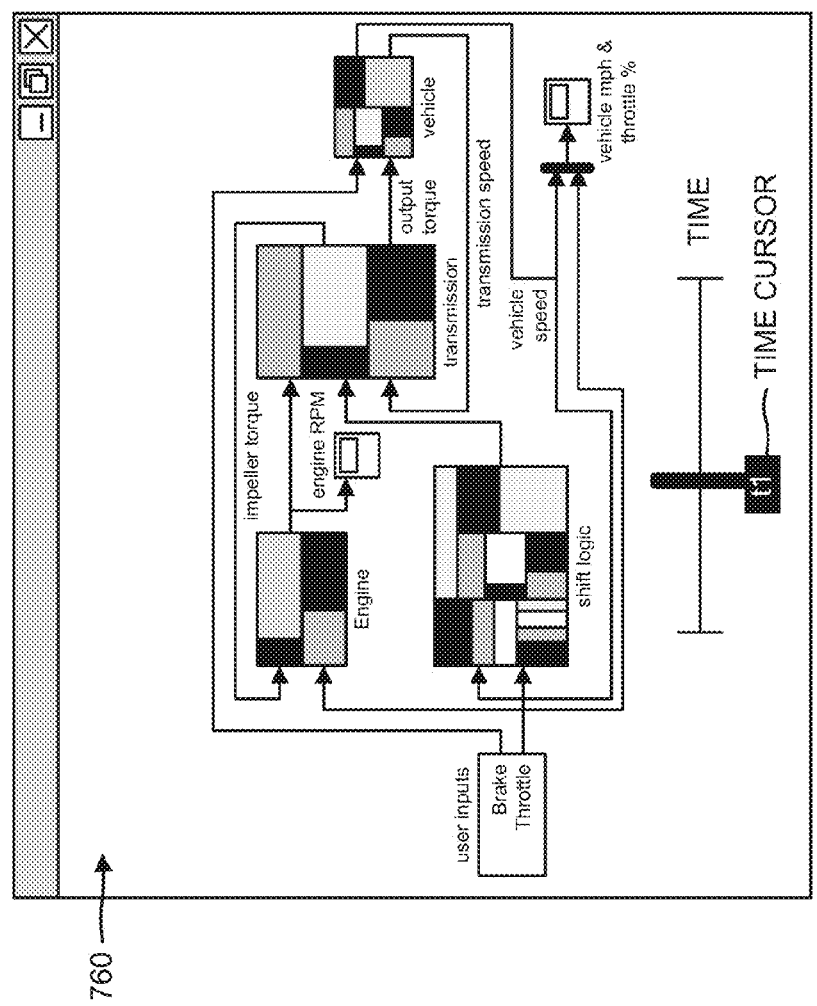

In some implementations, coverage determiner 725 may generate a user interface 760 for time-based coverage view 735, as shown in FIG. 7F. User interface 760 may include information associated with model 710, and a coverage mirror view of model 710. In example 700, the information associated with model 710 may include blocks associated with components of a vehicle. The coverage mirror view may include treemaps provided on blocks of model 710. The surface area of the treemaps may provide an indication of the cumulative coverage by the blocks of model 710 through a particular time. In example 700, a treemap may be provided over an engine block, a shift logic block, a transmission block, and a vehicle block of model 710.

As further shown in FIG. 7F, user interface 760 may also include a time cursor that may enable the user to change a time associated with the coverage information. The user may manipulate the time cursor so that different views of the coverage information may be displayed over time. In example 700, the user may provide the time cursor at a particular time (e.g., time t1), and the surface area of the treemaps may provide an indication of the cumulative coverage by the blocks of model 710 through the particular time.

Figure 7G:
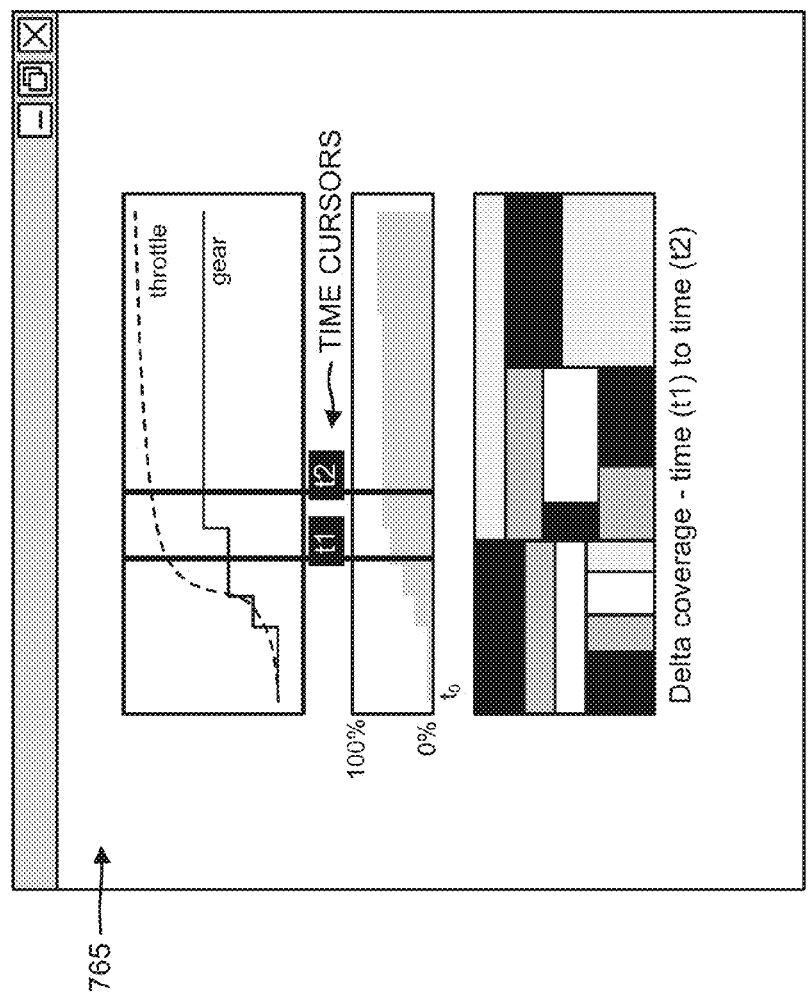

In some implementations, coverage determiner 725 may generate a user interface 765 for time-based coverage view 735, as shown in FIG. 7G. User interface 765 may include an output of the executed model 710 and/or code 715, and a post simulation analysis of delta coverage. In example 700, the output of the executed model 710 and/or code 715 may include information associated with a throttle and a gear. The post simulation analysis of delta coverage may include a stacked area plot that shows aggregate coverage over time. The stacked area plot may align with numeric data of the output of the executed model 710 and/or code 715. The post simulation analysis of delta coverage may include a treemap that represents files, functions, etc. of code 715 and/or blocks, subsystems, etc. of model 710. The surface area of the treemap may provide an indication of the delta coverage by model 710 and/or code 715 between two particular times. In some implementations, the surface area of the treemap may provide an indication of either delta coverage or absolute coverage by model 710 and/or code 715 between the two times. The delta coverage may look at what has been covered in addition, and the absolute coverage may look at what has been covered in total over a period between the two particular times.

As further shown in FIG. 7G, user interface 765 may also include time cursors that may enable the user to change times associated with the delta coverage. The user may manipulate the time cursors so that different views of the delta coverage may be displayed. In example 700, the user may provide the first time cursor at a first time (e.g., time t1) and the second time cursor at second time (e.g., time t2), and the surface area of the treemap may provide an indication of the delta coverage by model 710 and/or code 715 between the first time and the second time.

Figure 7H:
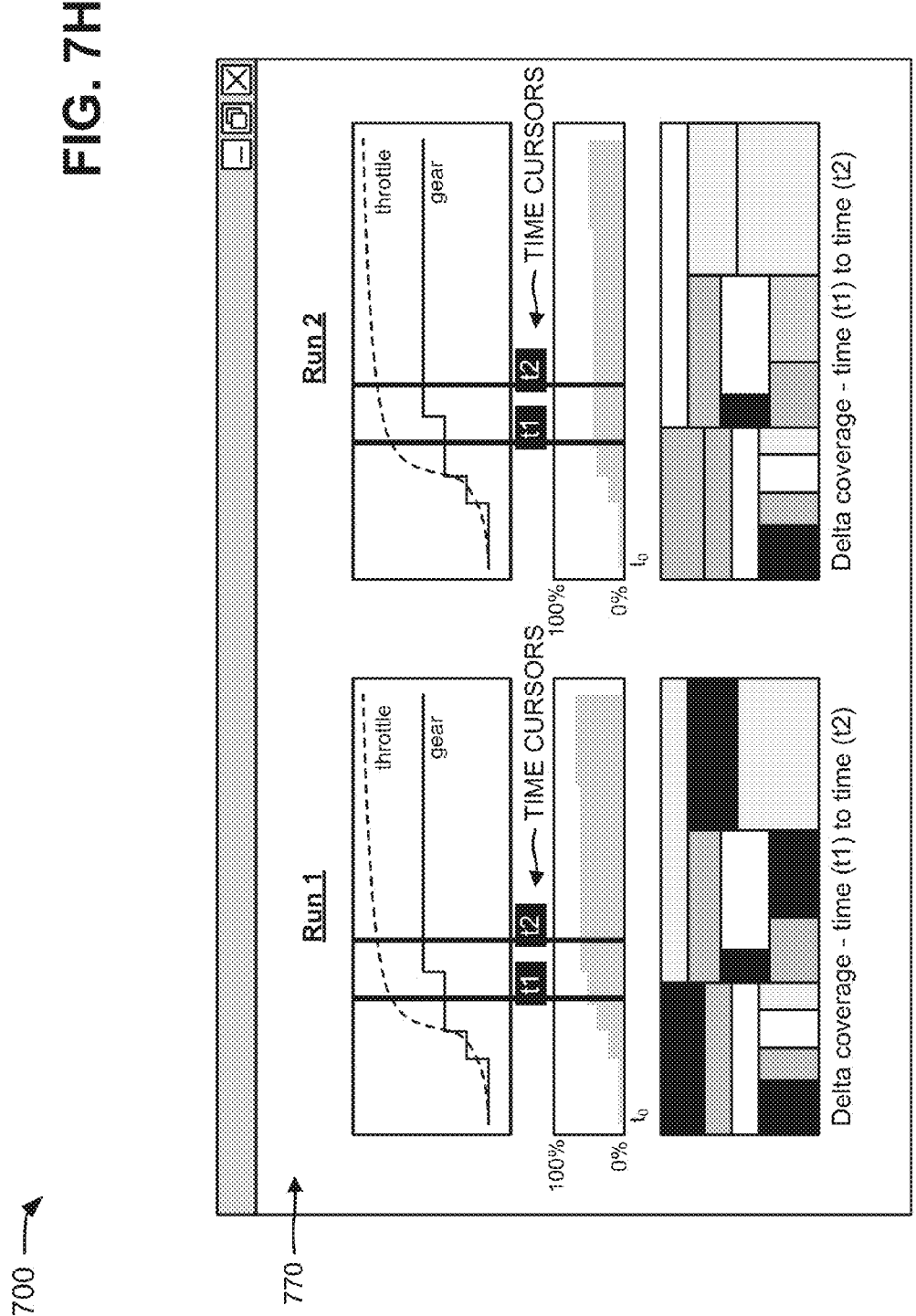

In some implementations, coverage determiner 725 may generate a user interface 770 for time-based coverage view 735, as shown in FIG. 7H. User interface 770 may include a first output and a second output of the executed model 710 and/or code 715, and a comparing coverage. In example 700, the first output of the executed model 710 and/or code 715 may include information associated with a first execution (Run 1) of model 710 and/or code 715. The second output of the executed model 710 and/or code 715 may include information associated with a second execution (Run 2) of model 710 and/or code 715. The first execution and the second execution may include different inputs, outputs, parameters, etc. associated with model 710 and/or code 715. For regression testing, the first execution may be based on a first version of model 710 and/or code 715, and the second execution may be based on a second version of model 710 and/or code 715.

The comparing coverage may include stacked area plots that show aggregate coverage over time for the first execution and the second execution. The stacked area plots may align with numeric data of the first and second outputs of the executed model 710 and/or code 715. The comparing coverage may include treemaps that represent files, functions, etc. of code 715 and/or blocks, subsystems, etc. of model 710. The surface areas of the treemaps may provide indications of the delta coverage by model 710 and/or code 715 between two particular times.

As further shown in FIG. 7H, user interface 770 may also include time cursors that may enable the user to change times associated with the delta coverage. The user may manipulate the time cursors so that different views of the delta coverage may be displayed. In example 700, the user may provide the first time cursor at a first time (e.g., time t1) and the second time cursor at second time (e.g., time t2), and the surface areas of the treemaps may provide indications of the delta coverage by model 710 and/or code 715 between the first time and the second time and during the first execution and the second execution. In example 700, assume that the first execution (Run 1) provides more delta coverage than the second execution (Run 2) as shown by the shading of the treemaps.

Figure 7I:
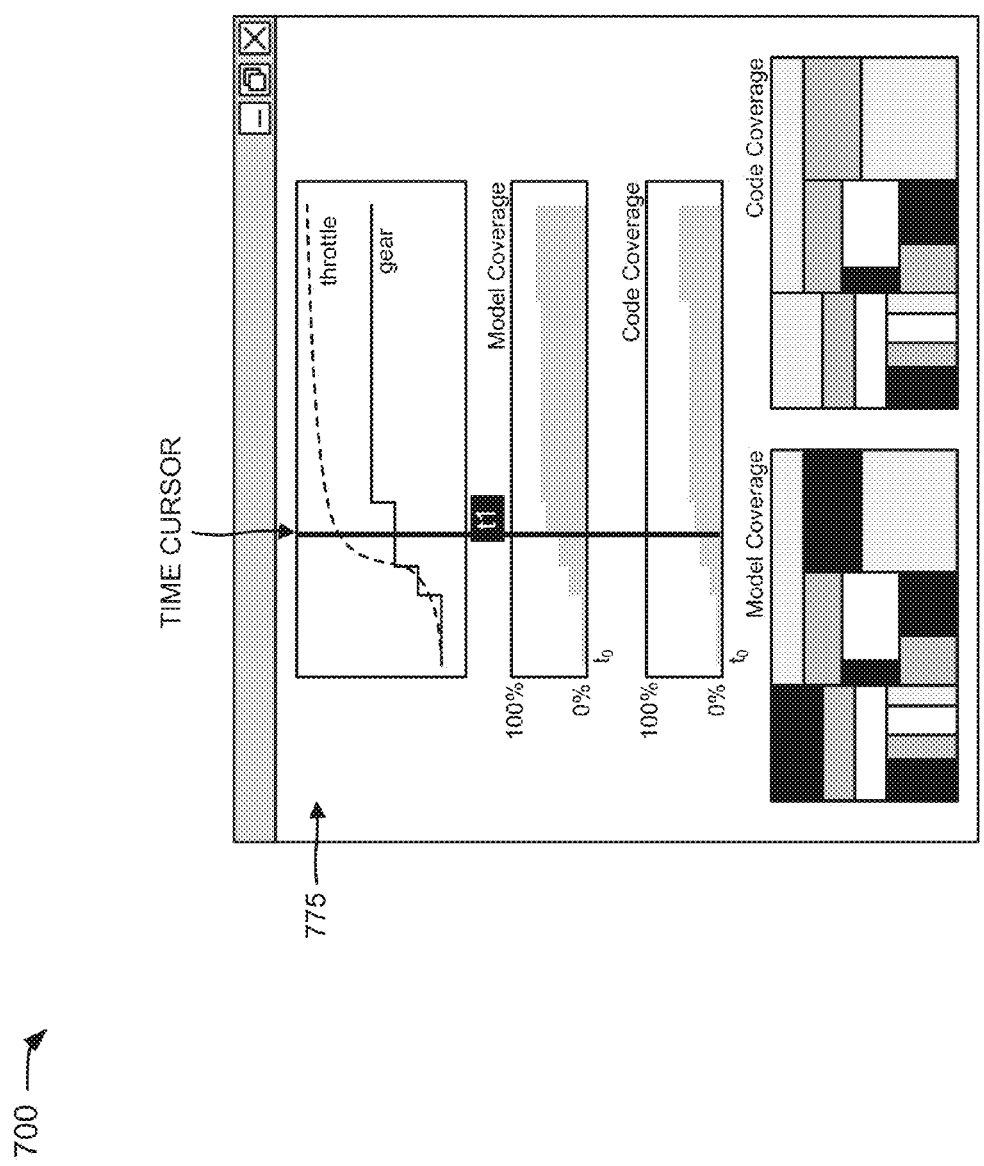

In some implementations, coverage determiner 725 may generate a user interface 775 for time-based coverage view 735, as shown in FIG. 7I. User interface 775 may include an output of the executed model 710 and/or code 715, and aligning model and code coverage. In example 700, the output of the executed model 710 and/or code 715 may include information associated with a throttle and a gear. The aligning model and code coverage may include a first stacked area plot that shows aggregate coverage over time for model 710, and a second stacked area plot that shows aggregate coverage over time for code 715. The first and second stacked area plots may align with numeric data of the output of the executed model 710 and/or code 715. The aligning model and code coverage may include a first treemap that represents blocks, subsystems, etc. of model 710, and a second treemap that represents files, functions, etc. of code 715. The surface area of the first and second treemaps may provide indications of the cumulative coverage by model 710 and/or code 715 through a particular time.

As further shown in FIG. 7I, user interface 775 may also include a time cursor that may enable the user to change a time associated with the coverage information. The user may manipulate the time cursor so that different views of the coverage information may be displayed over time. In example 700, the user may provide the time cursor at a particular time (e.g., time t1), and the surface areas of the first and second treemaps may provide indications of the cumulative coverage by model 710 and/or code 715 through the particular time.

Figure 7J:
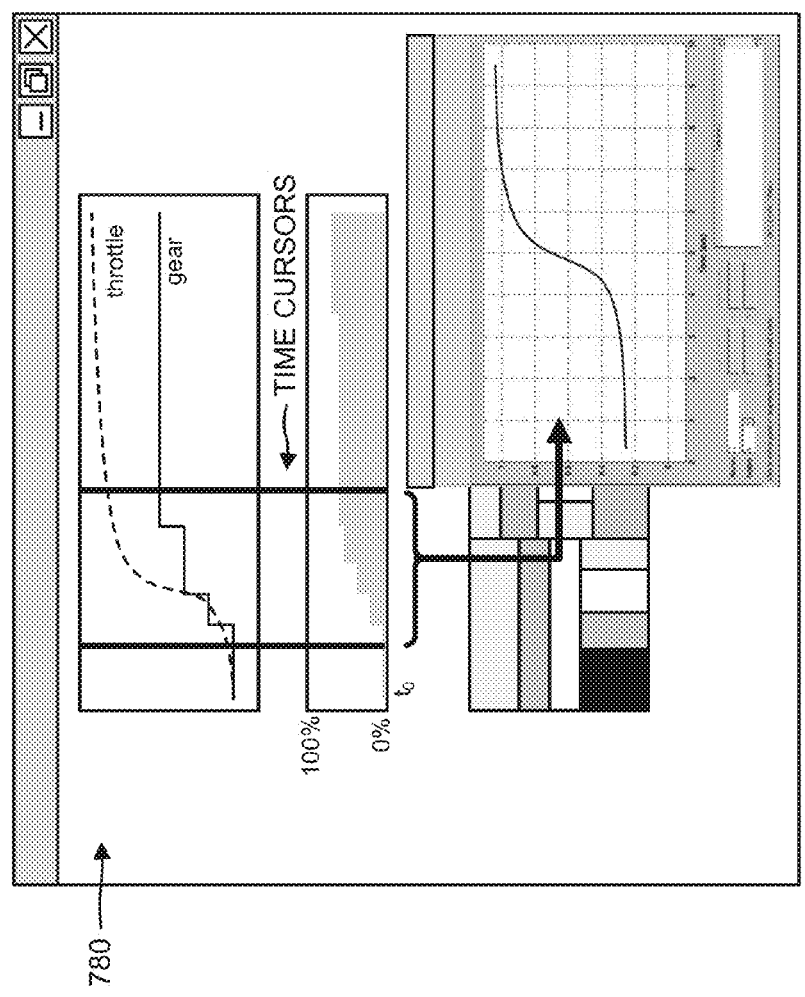

In some implementations, coverage determiner 725 may generate a user interface 780 for time-based coverage view 735, as shown in FIG. 7J. User interface 780 may include an output of the executed model 710 and/or code 715, and a forming test cases view. In example 700, the output of the executed model 710 and/or code 715 may include information associated with a throttle and a gear. The forming test cases view may include a stacked area plot that shows aggregate coverage over time. The stacked area plot may align with numeric data of the output of the executed model 710 and/or code 715. The forming test cases view may include a treemap that represents files, functions, etc. of code 715 and/or blocks, subsystems, etc. of model 710. The surface area of the treemap may provide an indication of the delta coverage by model 710 and/or code 715 between two particular times.

As further shown in FIG. 7J, user interface 780 may also include time cursors that may enable the user to change times associated with the delta coverage. In example 700, the user may provide the first time cursor at a first time and the second time cursor at second time, and the surface area of the treemap may provide an indication of the delta coverage by model 710 and/or code 715 between the first time and the second time. The forming test cases view may also include a graph of a portion of the executed model 710 and/or code 715 provided between the time cursors. The time cursors may define a test case start position and a test case stop position for the graph. The user may manipulate the time cursors to fine tune the test case and achieve a desired coverage for model 710 and/or code 715. This may greatly reduce a time required to attain a coverage objective for model 710 and/or code 715.

Figure 7K:
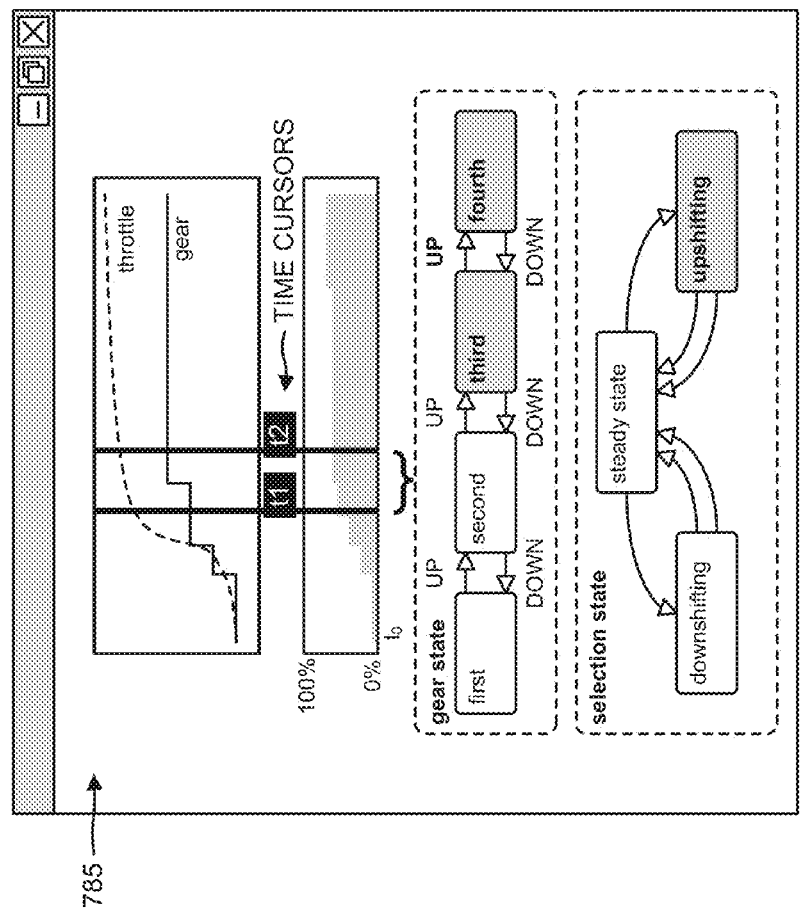

In some implementations, coverage determiner 725 may generate a user interface 785 for time-based coverage view 735, as shown in FIG. 7K. User interface 785 may include an output of the executed model 710 and/or code 715, and a coverage projection on model 710. In example 700, the output of the executed model 710 and/or code 715 may include information associated with a throttle and a gear. The coverage projection may include a stacked area plot that shows aggregate coverage over time. The coverage projection may also include blocks associated with discrete states (e.g., a gear state, a selection state, etc.) of a vehicle. For example, the gear state may include blocks for first gear, second gear, third gear, and fourth gear. The selection state may include blocks for downshifting, steady state, and upshifting. A block may be shaded if coverage is provided for the block, and a block may not be shaded if coverage is not provided for the block. In some implementations, coverage results may be gathered and displayed based on states, entry/during/exit actions, transitions, transition events, conditions on transitions, junctions, truth table cells, graphical function calls, etc.

As further shown in FIG. 7K, user interface 785 may also include time cursors that may enable the user to change times associated with a delta coverage. In example 700, the user may provide a first time cursor at a first time (e.g., time t1) and a second time cursor at second time (e.g., time t2), and the third gear block, the fourth gear block, and the upshifting block may be shaded. These blocks may be shaded since the portion of the executed model 710 and/or code 715 provided between the time cursors is associated with upshifting the vehicle from a third gear to a fourth gear.

As indicated above, FIGS. 7A-7K are provided merely as an example. Other examples are possible and may differ from what was described with regard to FIGS. 7A-7K.

CONCLUSION

Systems and/or methods described herein may enable coverage information for a model and/or code to be displayed in a time-based view. The systems and/or methods may execute the model and/or code, and may determine coverage information, associated with the executing model and/or code, over time. The coverage information may be stored and may be displayed in the time-based view. The time-based view may provide a mechanism (e.g., a time cursor) that may enable a user to change a time associated with the coverage information. The user may manipulate the mechanism so that different views of the coverage information may be displayed over time.

The foregoing description of implementations provides illustration and description, but is not intended to be exhaustive or to limit the implementations to the precise form disclosed. Modifications and variations are possible in light of the above teachings or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" that performs one or more functions. This component may include hardware, such as a processor, an ASIC, or a FPGA, or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    receiving code,
        the code being an executable representation of a dynamic system that includes a behavior that changes over time, and
        the receiving the code being performed by a device;
    executing one or more portions of the code,
        the executing of the one or more portions of the code being performed by the device;
    determining coverage information associated with the executing of the one or more portions of the code,
        the coverage information providing a measure of completeness associated with the executing of the one or more portions of the code, and
        the determining the coverage information being performed by the device;
    providing, for display, a plurality of options for displaying the coverage information, the providing for display being performed by the device;
    receiving a selected option, from the plurality of provided options, for displaying the coverage information,
        the receiving the selected option being performed by the device; and
    providing, for display and based on the selected option, a comparative view of information,
        the comparative view of the information including a time-based view of the coverage information based on the selected option and an output of the executing of the one or more portions of the code, and
        the providing for display the comparative view being performed by the device.

2. The method of claim 1, further comprising:
    providing information associated with the selected option to a computing environment associated with the code; and
    manipulating, based on an input, one or more time periods associated with the time-based view.

3. The method of claim 1, where the time-based view includes:
    one or more time cursors that enable a user to manipulate one or more time periods associated with the time-based view, and
    a representation that provides cumulative coverage of the code through a particular time period of the one or more time periods.

4. The method of claim 1, where the code represents a model and the time-based view includes:
    one or more blocks associated with the model,
    one or more time cursors that enable a user to manipulate one or more time periods associated with the time-based view, and
    a treemap that provides cumulative coverage of the model through a particular time period, of the one or more time periods, set by the one or more time cursors.

5. The method of claim 1, where the code represents a model and the time-based view includes:
    one or more blocks associated with the model,
    one or more time cursors that enable a user to manipulate one or more time periods associated with the time-based view, and
    a treemap associated with each of the one or more blocks, the treemap providing cumulative coverage of a corresponding block through a particular time period, of the one or more time periods, set by the one or more time cursors.

6. The method of claim 1, where the time-based view includes:
    two time cursors that enable a user to manipulate one or more time periods associated with the time-based view, and
    a treemap that provides delta coverage of the code between a particular time period, of the one or more time periods, set by the two time cursors.

7. The method of claim 1, where the code represents a model and the time-based view includes:
    one or more time cursors that enable a user to manipulate one or more time periods associated with the time-based view,
    a first treemap that provides cumulative coverage of the model through a particular time period of the one or more time periods, and
    a second treemap that provides cumulative coverage of the code through the particular time period.

8. A non-transitory computer-readable medium for storing instructions, the instructions comprising:
    one or more instructions that, when executed by a processor of a device, cause the processor to:
        receive code,
            the code being an executable representation of a dynamic system that includes a behavior that changes over time;
        execute one or more portions of the code;
        determine coverage information associated with the executing of the one or more portions of the code,
            the coverage information providing a measure of completeness associated with the executing of the one or more portions of the code;
        provide, for display, a plurality of options for displaying the coverage information;
        receive a selected option, from the plurality of provided options, for displaying the coverage information;
        provide, for display and based on the selected option, a comparative view of information,
            the comparative view of the information including a time-based view of the coverage information based on the selected option and an output of the executing of the one or more portions of the code; and
        manipulate, based on an input, one or more time periods associated with the time-based view.

9. The computer-readable medium of claim 8, where the instructions further comprise:
    one or more instructions that, when executed by the processor, cause the processor to:
        provide information associated with the selected option to a computing environment associated with the code.

10. The computer-readable medium of claim 8, where the code represents a model and the time-based view includes:
    one or more time cursors that enable a user to manipulate the one or more time periods, and
    a treemap that provides cumulative coverage of the model or the code through a particular time period of the one or more time periods.

11. The computer-readable medium of claim 8, where the code represents a model and the time-based view includes:
    one or more blocks associated with the model,
    one or more time cursors that enable a user to manipulate the one or more time periods, and
    a treemap that provides cumulative coverage of the model through a particular time period, of the one or more time periods, set by the one or more time cursors.

12. The computer-readable medium of claim 8, where the code represents a model and the time-based view includes:
    one or more blocks associated with the model,
    one or more time cursors that enable a user to manipulate the one or more time periods, and
    a treemap associated with each of the one or more blocks, the treemap providing cumulative coverage of a corresponding block through a particular time period, of the one or more time periods, set by the one or more time cursors.

13. The computer-readable medium of claim 8, where the time-based view includes:
    two time cursors that enable a user to manipulate the one or more time periods, and
    a treemap that provides delta coverage of the code between a particular time period, of the one or more time periods, set by the two time cursors.

14. The computer-readable medium of claim 8, where the code represents a model and the time-based view includes:
    one or more time cursors that enable a user to manipulate the one or more time periods,
    a first treemap that provides cumulative coverage of the model through a particular time period of the one or more time periods, and
    a second treemap that provides cumulative coverage of the code through the particular time period.

15. A device comprising:
    one or more processors to:
        receive code,
            the code being an executable representation of a dynamic system that includes a behavior that changes over time;
        execute one or more portions of the code;

determine coverage information associated with the executing of the one or more portions of the code,
  the coverage information providing a measure of completeness associated with the executing of the one or more portions of the code;
provide, for display, a plurality of options for displaying the coverage information;
receive a selected option, from the plurality of provided options, for displaying the coverage information;
provide, for display and based on the selected option, a comparative view of information,
  the comparative view of the information including a time-based view of the coverage information based on the selected option and an output of the executing of the one or more portions of the code; and
manipulate, based on an input, one or more time periods associated with the time-based view.

16. The device of claim 15, where the one or more processors are further to:
provide information associated with the selected option to a computing environment associated with the code.

17. The device of claim 15, where the time-based view includes:
one or more time cursors that enable a user to manipulate the one or more time periods, and
a treemap that provides cumulative coverage of the code through a particular time period of the one or more time periods.

18. The device of claim 15, where the code represents a model and the time-based view includes:
one or more blocks associated with the model,
one or more time cursors that enable a user to manipulate the one or more time periods, and
a treemap that provides cumulative coverage of the model through a particular time period, of the one or more time periods, set by the one or more time cursors.

19. The device of claim 15, where the code represents a model and the time-based view includes:
one or more blocks associated with the model,
one or more time cursors that enable a user to manipulate the one or more time periods, and
a treemap associated with each of the one or more blocks, the treemap providing cumulative coverage of a corresponding block through a particular time period, of the one or more time periods, set by the one or more time cursors.

20. The device of claim 15, where the code represents a model and the time-based view includes:
two time cursors that enable a user to manipulate the one or more time periods, and
a treemap that provides delta coverage of the model or the code between a particular time period, of the one or more time periods, set by the two time cursors.

21. The device of claim 15, where the code represents a model and the time-based view includes:
one or more time cursors that enable a user to manipulate the one or more time periods,
a first treemap that provides cumulative coverage of the model through a particular time period of the one or more time periods, and
a second treemap that provides cumulative coverage of the code through the particular time period.

\* \* \* \* \*